Dec. 28, 1926.
E. W. STOLER
METHOD OF MAKING SPOKE NIPPLES
Filed Sept. 5, 1925
1,612,751
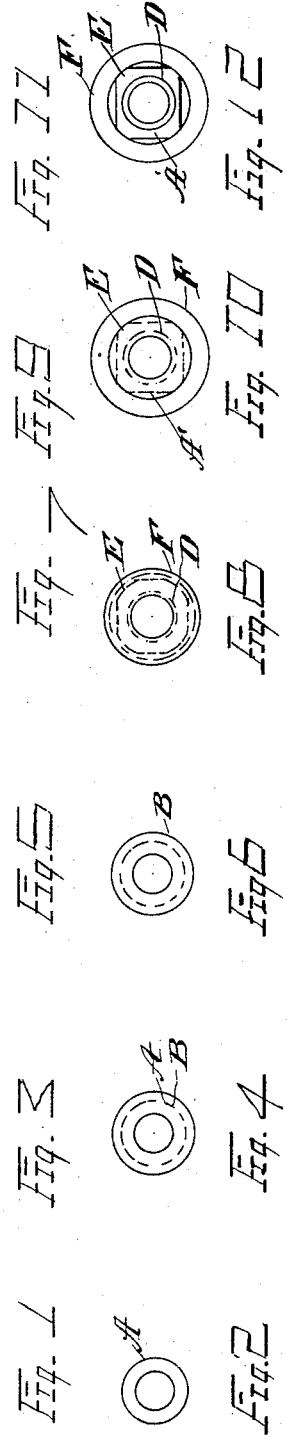
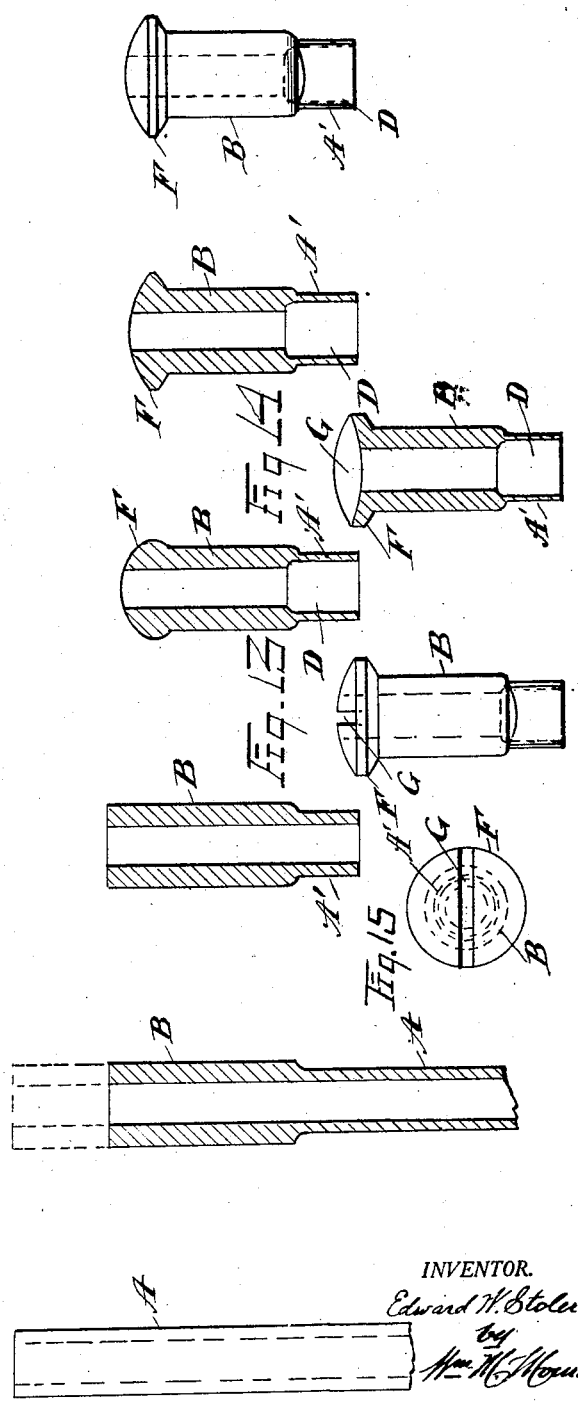
INVENTOR.
Edward W. Stoler
by
Wm. M. Moore
ATTORNEY.

Patented Dec. 28, 1926.

1,612,751

UNITED STATES PATENT OFFICE.

EDWARD W. STOLER, OF MANSFIELD, OHIO.

METHOD OF MAKING SPOKE NIPPLES.

Application filed September 5, 1925. Serial No. 54,801.

The objects of the invention are to provide an improved nipple for wire spokes, and an improved process or mechanical method of constructing the same from cylindrical metal tubing, the internal diameter of which is equal to the diameter of the spoke, thus eliminating the amount of time and labor required in boring and reaming a solid metal blank, also by means of this method of construction the body of the nipple can be formed from a piece of tubing of less diameter than the finished nipple and closely approximating the short diameter of the squared portion thereof.

In this manner production can be rapidly attained without loss of time or labor, since all the operations except tapping the orifice can be produced with dies, and a very accurate and highly finished nipple can be produced. The process includes several successive steps, which are taken in the following order:

A portion of one end of the tube equal to the predetermined length of the body of the nipple as far as the squared portion is laterally expanded by upsetting the tube in suitable dies, until the diameter equals that of the finished nipple. The tube is then severed at a point below the expanded portion equal to the length of the squared portion and the flat faces and angles are formed thereon by introducing a mandrel or punch or drift into the central opening and expanding the tube against forming dies having a squared opening therein, until a counter-bore is produced of such diameter that the amount of metal displaced by the action of the central drift or mandrel will be equal to the amount of metal required to fill out the angles of the squared portion of the nipple, or shank portion. After this has been accomplished, a heading die or dies are employed to form the head of the nipple and finally a circular cutting tool such as a milling cutter is utilized to cut the transverse slot in the head by means of which the tension upon the spoke may be adjusted.

The effects of the several steps employed are illustrated in the accompanying drawings, hereinafter more definitely described, and pointed out in the claims.

In the accompanying drawings;

Fig. 1 is a plan of the tubing employed in constructing the nipple; Fig. 2 is a side elevation thereof; Fig. 3 is a plan showing the upset end of the tube. Fig. 4 is a longitudinal section showing the thickened end of the tube; Fig. 5 is a plan of the severed nipple; Fig. 6 is a longitudinal section thereof; Fig. 7 is a plan of the same showing the action of the first heading die; Fig. 8 is a longitudinal section thereof; Fig. 9 is a plan showing the head fully expanded, and Fig. 10 is a longitudinal section thereof; Fig. 11 is a bottom view of the completed nipple; and Fig. 12 is a side elevation thereof; Fig. 13 is a side elevation showing the slotted kerf in the head for the screw driver; Fig. 14 is a longitudinal section thereof, and Fig. 15 is a plan of the head.

In these views A is a length of tubing which may be coiled or bar length, and has the outside diameter of the same size or smaller than that of the wrench across the flat sides of the nipple. One extremity of this tubing is upset at B in suitable upsetting dies in one or more operations without affecting the inner diameter of the tubing, which may be of suitable tap size to receive the threaded end of the spoke.

The outside diameter of the upset portion should equal that of the body of the finished nipple and its length should be sufficient to form the body and leave metal enough to form the head, and the remaining portion A' after cutting the nipple from the tube, should equal that of the shank or squared portion of the nipple.

The nipple is then cut from the tube, as shown in Figs. 5 and 6.

The next step is to form the counter-bore D in the smaller portion by pressure as shown in Figs. 7 and 8. By this means the metal pressed outward by the mandrel or drift inserted in the central opening is forced outward in suitable dies having a square opening therein until the displaced metal has filled out the corners of the squared portion of the shank ready to receive the wrench.

To accomplish this action the amount of metal displaced must equal the amount of metal contained in the aforesaid corners, E. E. Also by means of a heading die or dies the thicker end of the body is expanded at F to partially form the head of the nipple. This action is continued in other dies until the head is perfectly formed, as shown in Figs. 9 and 10.

The appearance of the completed nipple is illustrated in Figs. 11 and 12.

In Figs. 13, 14 and 15 the slot G is shown which is preferably formed by means of a circular saw or milling cutter, which does not crack or distort the edges of the head, and by this process a nicely finished piece of work is produced, having a smooth polished surface and ready for immediate use.

Having described the invention what I claim as new and desire to secure by Letters Patent is, 1. The hereinbefore described process or method of constructing a nipple, consisting in, first upsetting the end of a metal tube or blank of substantially the diameter of the squared portion of the nipple across the flats thereof, upsetting one end of said tubing to form the body of the nipple leaving a sufficient length therein to form the head, expanding outwardly the remaining or shank portion in a die or dies having an angular opening, to form a counter bore therein, the amount of metal displaced thereby being sufficient when expanded to form the angles of the shank portion of the nipple, and subsequently pressing the extremity of the enlarged body portion to form a head thereon.

2. The hereinbefore described process or method of constructing a nipple, consisting in, first upsetting the end of a metal tube or blank of substantially the diameter of the squared portion of the nipple across the flats thereof, upsetting one end of said tubing to form the body of the nipple leaving a sufficient length therein of metal to form the head, expanding outwardly the remaining or shank portion in a die or dies having an angular opening to form a counter bore therein, the amount of metal displaced thereby being sufficient when expanded to form the angles of the shank portion of the nipple, and subsequently pressing the extremity of the enlarged body portion to form a head thereon, and afterwards cutting a transverse inwardly curved slot in said head.

3. The hereinbefore described process or method of constructing a nipple, consisting in, first upsetting the end of a metal tube of substantially the diameter of the squared portion of the nipple across the flats thereof, upsetting one end of said tubing to form the body of the nipple, leaving a sufficient length therein to form the head, expanding outwardly the remaining or shank portion in a die or dies having an angular opening to form a counter bore therein, the amount of metal displaced thereby being sufficient when expanded to form the angles of the shank portion of the nipple, and subsequently pressing the extremity of the enlarged body portion to form a head thereon, and afterwards cutting a transverse inwardly curved slot in said head, and finally tapping said body portion to receive the end of the spoke.

4. The hereinbefore described process of constructing a nipple of the character described from metal tubing, consisting in, first upsetting a portion of metal tubing at one end to form the body and head of said nipple, next, severing said tubing at a point spaced from said body to provide a shank for said body, next forming a counter bore by expanding said shank internally in angular dies to form flat sides and alternate angles thereon, and forming a head upon said body portion, substantially as and in the manner described.

5. The process of forming a nipple from a tubular blank having a cylindrical cross section less than the cylindrical cross section of the body of the finished nipple and of greater length than said nipple consisting in, upsetting one end thereof to form the body and head of said nipple of greater diameter than said tube, severing said tube at a point below said enlarged portion sufficiently distant therefrom to include the shank portion of said nipple, flowing the metal laterally and outwardly in the walls of said shank portion, to fill out the corners of said squared shank, and forming a head upon said enlarged body portion.

In testimony whereof, I hereunto set my hand this 11th day of May 1925.

EDWARD W. STOLER.